(12) United States Patent
Barber

(10) Patent No.: X8031
(45) Date of Patent: Feb. 28, 1834

(54) SPINDLE & BUSH, FOR GRIST MILL

(76) Inventor: Jesse Barber

Jesse Barber, of Phelps, New York.

Letters Patent.

The schedule referred to in these Letters Patent and making part of the same containing a description in the words of the said Jesse Barbour himself of his improvement in the Bush and Spindle to a Grist Mill To all to whom these presents shall come Be it known that I Jesse Barber, of Phelps in the county of Ontario and State of New York have invented a new and useful improvement in the Bush and Spindle to a grist mill, and that the following is a full and exact description of the construction and operation of said Machine as invented and improved by me ....

First, the outer frame of the bush is of cast iron of the common & ordinary form, the corner blocks of the inner part of the frame of the bush with the followers are scaling pressing against the spindle at a higher point than they do against the box or frame of the bush, This rounding up from the frame of the bush to the spindle is carried to the extent of three forths of an inch and in operation throws off, from around the spindle dust grain or any thing else that is too apt to accumulate around the spindle, — The followers which steady the spindle are in the ordinary form except that they are scaling as above stated, — The wedges which are used to confine the followers to their place, are of wrought iron and are designed to extend three forths of an inch above the frame of the bush & descend below the main bush and form a screw bolt From the ordinary outer frame of the bush of cast iron descends a stirrup to the bottom of the bed stone & at the end of the stirrup a foot is formed, Thro' this foot descends the screw bolt from the wedges and on the under side of this foot by means of the screw and nut the wedges may be moved at pleasure pressing the followers to the spindle, or from it at the option of the miller This saves the trouble, loss of time and labour of removing the stone to tighten or loosen the wedges. The four wedges nuts & screws are alike for the purpose of preventing friction of the wed-ges and spindle and save the labor of frequent oiling, I have constructed a tube or pipe projecting a short distance above the driver descends through it & passes into a hole in the shoulder or neck of the spindle — A small hole is then bored from the outer side of the spindle to meet the one into which the tube descends — The tube is then supplied with oil which descends into the holes in the spindle and is distributed around the followers and spindle. The tube may be sufficiently large to supply oil for forty eight hours, ——

By these several improvements the necessary oil is supplied around the spindle and followers without the trouble of removing the stones to oil them, ——

The wedges are tightened and loosened at the pleasure of the miller by the bare operation of turning a screw, and the spindle is kept steadily at its place by the same operation.

The oil being thus liberally and constantly supplied, the followers may be of wood cast iron or any other suitable metal ——

I claim to be the inventor of the mode above described of oiling the spindle and followers of the mode above described of wedging the followers and steadying the spindle.

Witnesses
William [illegible]
Thomas Smith

Jesse Barbor

Exd
[illegible]